US 8,355,045 B2

(12) United States Patent
Sotodate

(10) Patent No.: US 8,355,045 B2
(45) Date of Patent: Jan. 15, 2013

(54) MONITOR RECORDING DEVICE

(75) Inventor: Hiromichi Sotodate, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1221 days.

(21) Appl. No.: 11/814,820

(22) PCT Filed: Jan. 31, 2006

(86) PCT No.: PCT/JP2006/301498
§ 371 (c)(1),
(2), (4) Date: Jul. 26, 2007

(87) PCT Pub. No.: WO2006/082795
PCT Pub. Date: Aug. 10, 2006

(65) Prior Publication Data
US 2009/0009598 A1    Jan. 8, 2009

(30) Foreign Application Priority Data

Feb. 1, 2005   (JP) ................................. 2005-025491

(51) Int. Cl.
*H04N 7/18*   (2006.01)
(52) U.S. Cl. .................... 348/143; 348/152; 348/169
(58) Field of Classification Search ............... 348/143, 348/152, 154, 155, 169, 352; 382/105
See application file for complete search history.

(56) References Cited

U.S. PATENT DOCUMENTS

| | | | |
|---|---|---|---|
| 5,043,811 A * | 8/1991 | Yasuhiro ....................... 348/458 |
| 6,323,897 B1 * | 11/2001 | Kogane et al. ................ 348/159 |
| 6,411,209 B1 * | 6/2002 | Lyons et al. .................. 348/152 |
| 6,456,321 B1 * | 9/2002 | Ito et al. ........................ 348/143 |
| 6,741,977 B1 * | 5/2004 | Nagaya et al. ................ 348/143 |
| 6,975,808 B1 * | 12/2005 | Uchihara et al. .............. 386/226 |
| 7,028,328 B2 * | 4/2006 | Kogane et al. ................ 348/143 |
| 7,664,292 B2 * | 2/2010 | van den Bergen et al. ... 348/152 |
| 2002/0067258 A1 * | 6/2002 | Lyons et al. .................. 340/541 |
| 2002/0175997 A1 * | 11/2002 | Takata et al. .................. 348/143 |

(Continued)

FOREIGN PATENT DOCUMENTS

JP    03-162188 A    7/1991

(Continued)

OTHER PUBLICATIONS

Title: Non-parametric Model for Background Subtraction Author: Ahmed Elgammal Date: 1999.*

(Continued)

*Primary Examiner* — Jeffrey R Swearingen
(74) *Attorney, Agent, or Firm* — Pearne & Gordon LLP

(57) ABSTRACT

The monitor recording device (10) can allow an operator to identify an object with ease by comprising a frame control unit (11) for receiving a video signal of a monitor area at a specific frame rate such as for example one frame per second. A compression/expansion unit (12) compresses video data indicative of the video signal. A moving object area detecting unit (15) receives an image of a monitor area at sixty frames per second, dividing the image into a plurality of sections, and detecting one or more sections including an image of a person going in and out of the monitor area. A person extracting unit (16) extracts an image of his/her face from the sections. An optimum image judging unit (17) determines an optimum image of his/her face. A picture-in-picture synthesizing unit (20) synthesizes the optimum image and the video data.

6 Claims, 8 Drawing Sheets

U.S. PATENT DOCUMENTS

| | | | |
|---|---|---|---|
| 2004/0001142 A1* | 1/2004 | Kumhyr | 348/143 |
| 2004/0001149 A1* | 1/2004 | Smith | 348/218.1 |
| 2004/0086193 A1* | 5/2004 | Kameyama et al. | 382/254 |
| 2005/0068454 A1* | 3/2005 | Afsenius | 348/345 |
| 2005/0244033 A1* | 11/2005 | Ekin et al. | 382/103 |

FOREIGN PATENT DOCUMENTS

| | | |
|---|---|---|
| JP | 07-131756 | 5/1995 |
| JP | 09-224237 A | 8/1997 |
| JP | 11-355762 A | 12/1999 |
| JP | 2000-232638 A | 8/2000 |
| JP | 2003-046911 A | 2/2003 |

OTHER PUBLICATIONS

International Search Report, dated Feb. 22, 2006.

* cited by examiner

FIG. 2

PICTURE-IN-PICTURE HEADER

| INDEX | xxxx |
|---|---|
| CAPTURING DATE AND TIME OF OPTIMUM IMAGE | YYYY:XXXX:DD HH:MM:SS |
| X-COORDINATE OF STARTING POINT FOR FACE AREA | 0 ~ 719 |
| X-COORDINATE OF ENDING POINT FOR FACE AREA | 0 ~ 719 |
| Y-COORDINATE OF STARTING POINT FOR FACE AREA | 0 ~ 239 |
| Y-COORDINATE OF ENDING POINT FOR FACE AREA | 0 ~ 239 |
| MOTIONLESS X BLOCK [Y BLOCK 0] | 0 ~ 3 |
| MOTIONLESS X BLOCK [Y BLOCK 1] | 0 ~ 3 |
| MOTIONLESS X BLOCK [Y BLOCK 2] | 0 ~ 3 |
| MOTIONLESS X BLOCK [Y BLOCK 3] | 0 ~ 3 |

MONITOR RECORDING DEVICE

TECHNICAL FIELD OF THE INVENTION

The present invention relates to a monitor recording device for recording video data indicative of a video of a person going in and out of, for example, a monitor area.

DESCRIPTION OF THE RELATED ART

The conventional monitor recording device comprises a magnetic head for recording, as monitoring data, a video signal from a camera unit on a magnetic tape at intervals, a magnetic dram provided with the magnetic head, and accelerating means for accelerating the magnetic dram when the magnetic dram is restarted at intervals. Even if the period of the intermittent recording operation is relatively short, the rotation frequency of the magnetic dram can be rapidly restored to its specified rotation frequency. Therefore, the conventional monitor recording device can reduce the monitoring data to be recorded on the magnetic tape while performing the recording operation at intervals (see, for example, a patent document 1).
patent document 1: Jpn. unexamined patent publication H07-131756 (page 4, FIG. 1)

DISCLOSURE OF THE INVENTION

Problems to be Solved by the Invention

The conventional monitor recording device, however, encounters such a problem that an image useful for allowing a watcher to identify an intruder and the like, for example, an optimum image of his/her face tends to fail to be recorded as part of the monitoring data on the magnetic tape, resulting from the fact that the video signal from the camera unit is thinned in frame, and intermittently recorded as monitoring data on the magnetic tape. As a result, the watcher tends to be difficult to identify the intruder by using the monitoring data.

It is, therefore, an object of the present invention to provide a monitor recording device which can reduce the monitoring data to be recorded in a storage unit, and record an optimum image useful for identifying a specific moving object such as for example an intruder with no difficulty.

Means for Solving the Problems

The monitor recording device according to the present invention comprises: moving object detecting means for detecting, from each frame of a video of a monitor area, a specific moving object which is in the monitor area; optimum image judging means for judging, as an optimum image, an image of the specific moving object detected from the video of the monitor area when the image of the specific moving object optimally complies with specific requirements; and recording means for recording the optimum image.

The monitor recording device thus constructed as previously mentioned according to the present invention can reduce the monitoring data to be recorded in a storage unit, and record an optimum image useful for identifying a specific moving object with no difficulty, even if the video signal is thinned in frame, and intermittently recorded as monitoring data in the storage unit.

In the monitor recording device according to the present invention, the recording means may be adapted to record shooting information of the optimum image, the shooting information including shooting date and time of the optimum image.

The monitor recording device thus constructed as previously mentioned according to the present invention can search, on the basis of the shooting information of the optimum image, for the specific moving object corresponding to the optimum image, by reason that the shooting information of the optimum image including shooting date and time of the optimum image is recorded in the storage unit in connection with the optimum image.

The monitor recording device according to the present invention may further comprise video signal outputting means for outputting a video signal indicative of the video thinned in frame of the monitor area, and image synthesizing means for performing the synthesis of the optimum image and the video thinned in frame represented by the video signal.

The monitor recording device thus constructed as previously mentioned according to the present invention can reduce the monitoring data to be recorded in a storage unit, and record an optimum image useful for identifying a specific moving object with no difficulty, by reason that the video signal is thinned in frame, and intermittently recorded as monitoring data in the storage unit while the optimum image of the specific moving object is superimposed on the video signal thinned in frame.

The monitor recording device according to the present invention may further comprise dividing means for dividing each frame of the video of the monitor area into a plurality sections. The dividing means may be adapted to classify the sections of each frame into first and second groups, the first group including one or more sections in which the specific moving object is detected, the second group including the remaining sections in which the specific moving object is not detected. The image synthesizing means may be adapted to perform the synthesis of the optimum image and the nearest section selected from among the sections of the second group on the basis of the distances of the sections of the second group to each section of the first group.

The monitor recording device thus constructed as previously mentioned according to the present invention can reduce the monitoring data to be recorded in a storage unit, and record an optimum image useful for identifying a specific moving object with no difficulty, by reason that the image synthesizing means is adapted to perform the synthesis of the optimum image and the nearest section selected from among the sections of the second group.

The monitor recording device according to the present invention may further comprise searching means for searching specific data recorded by the recording means for data indicative of the optimum image. The image synthesizing means may be adapted to perform, when the data corresponding to the optimum image is extracted from the data recorded by the recording means, the synthesis of the video thinned in frame represented by the video signal, the optimum image, and shooting information including shooting date and time of the optimum image.

The monitor recording device thus constructed as previously mentioned according to the present invention can allow an operator to confirm the shooting information of an image of a person and the like which is in the monitoring area by reason that the image synthesizing means is adapted to perform the synthesis of the optimum image, shooting information including shooting date and time of the optimum image, and the video thinned in frame represented by the video signal.

In the monitor recording device according to the present invention, the image of the specific moving object may be constituted by an image of a person which is in the monitor area, the optimum image may be constituted by an image of his/her face, the specific requirements may relate to at least one of size, contrast, luminance, gamma value, and direction of his/her face extracted from the video of the monitor area.

The monitor recording device thus constructed as previously mentioned according to the present invention can reduce the monitoring data to be recorded in a storage unit, and record an optimum image useful for identifying a specific moving object with no difficulty, by reason that the video signal from the camera unit is thinned in frame, and intermittently recorded as monitoring data in the storage unit while the judgment is made on whether or not the image of his/her face extracted from the video of the monitor area meets specific requirements related to at least one of size, contrast, luminance, gamma value, and direction, the optimum image of his/her face being then recorded in the storage unit.

In the monitor recording device according to the present invention, the image of the specific moving object may be constituted by an image of an automotive vehicle which is in the monitor area. The optimum image may be constituted by an image of a license plate of the automotive vehicle. The specific requirements may relate to at least one of size, contrast, luminance, gamma value, and direction of the license plate extracted from the video of the monitor area.

The monitor recording device thus constructed as previously mentioned according to the present invention can reduce the monitoring data to be recorded in a storage unit, and record an optimum image useful for identifying a specific moving object with no difficulty, by reason that the video signal from the camera unit is thinned in frame, and intermittently recorded as monitoring data in the storage unit while the judgment is made on whether or not the image of the license plate of the automotive vehicle extracted from the video of the monitor area meets specific requirements related to at least one of size, contrast, luminance, gamma value, and direction, the optimum image of the license plate being then recorded in the storage unit.

ADVANTAGEOUS EFFECT OF THE INVENTION

The present invention provides a monitor recording device that can reduce the monitoring data to be recorded in a storage unit, and record an optimum image useful for identifying a specific moving object with no difficulty.

BRIEF DESCRIPTION OF THE DRAWINGS

FIG. 2 is a diagram showing an example of a picture-in-picture header information of the monitor recording device according to the first embodiment of the present invention.

EXPLANATION OF THE REFERENCE NUMERALS

Figure 1:
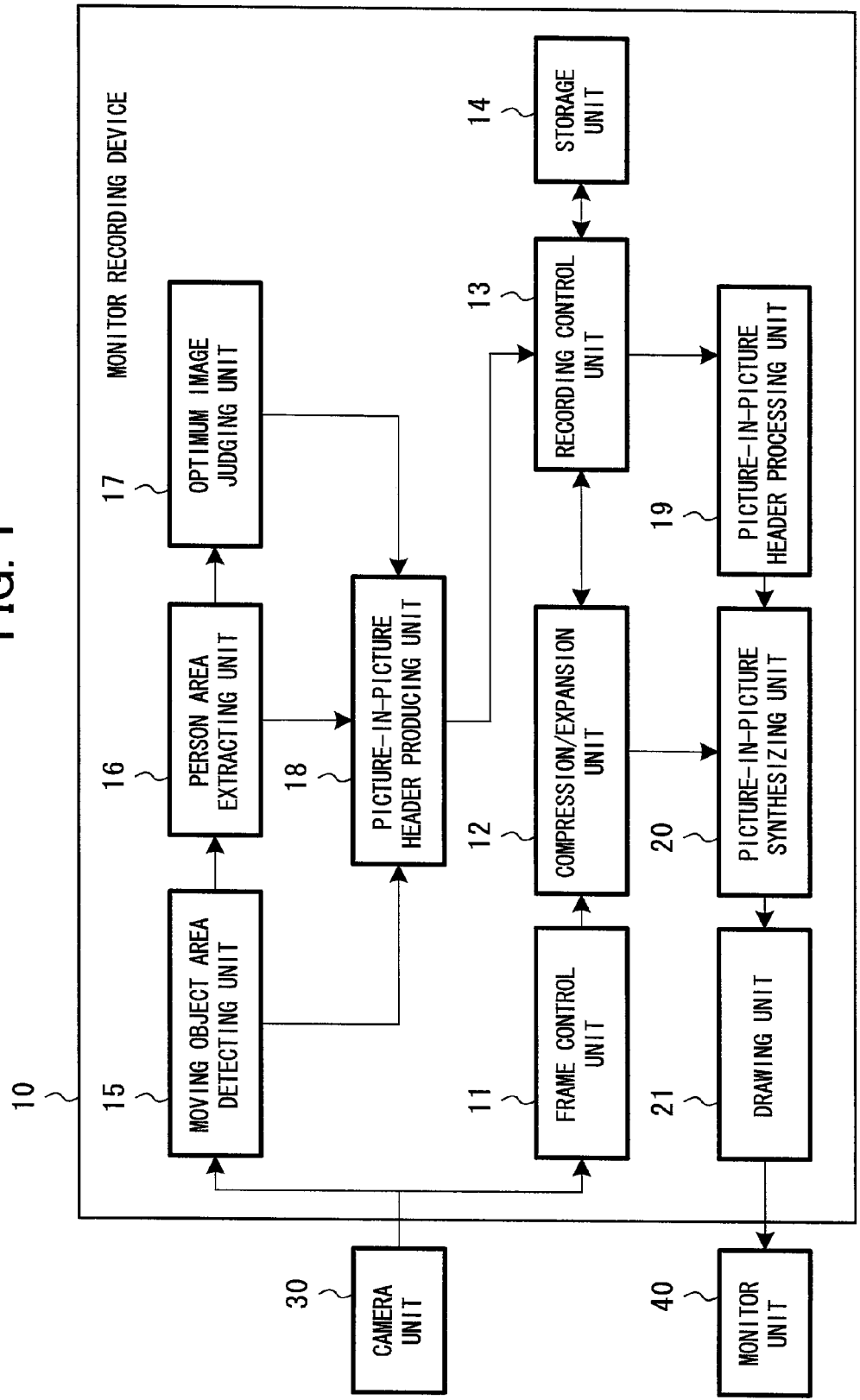
FIG. 1 is a block diagram showing the first embodiment of the monitor recording device according to the present invention.

10 and 50: monitor recording device
11 and 51: frame control unit (video signal outputting means)
12 and 52: compression/expansion unit
13 and 53: recording control unit
14: storage unit (recording means)
15 and 55: moving object area detecting unit (moving object detecting means, dividing means)
16 and 56: person area extracting unit
17 and 57: optimum image judging unit (optimum image extracting means)
18 and 58: picture-in-picture header producing unit
19 and 59: picture-in-picture header processing unit
20 and 60: picture-in-picture synthesizing unit (image synthesizing means)
21 and 61: drawing unit
30: camera unit
40: monitor unit
54: storage unit (recording means)
62: face searching unit (searching means)

DESCRIPTION OF THE PREFERRED EMBODIMENTS

The preferred embodiments of the monitor recording device according to the present invention will be described hereinafter with reference to accompanying drawings.

First Embodiment

The following description will be directed to the case that the monitor recording device according to the first embodiment of the present invention records monitoring data indicative of a video of a person going in and out of a monitor area.

As shown in FIG. 1, the monitor recording device 10 according to the first embodiment of the present invention comprises a camera unit 30 for taking an image of a monitor area at a specific frame rate, and outputting a video signal indicative of the image, a frame control unit 11 for thinning in frame the video signal from the camera unit 30, a compression/expansion unit 12 for compressing the video signal thinned in frame, and producing compressed video data, a storage unit 14 for recording the compressed video data therein, a recording control unit 13 for controlling the storage unit 14, a moving object area detecting unit 15 for detecting, from among a plurality of sections of each frame of the video signal from the camera unit 30, one or more sections including an image of a person going in and out of the monitor area, a person extracting unit 16 for extracting an image of his/her face from one or more sections detected by the moving object area detecting unit 15, an optimum image judging unit 17 for judging whether or not the image of his/her face extracted from one or more sections of the current frame is clear, and identifying the image of his/her face extracted from the current frame as an optimum image when that is, till now, the clearest of the images of his/her face, a picture-in-picture header producing unit 18 for producing picture-in-picture header information to be added to the optimum image, a picture-in-picture header processing unit 19 for processing the picture-in-picture header information, a picture-in-picture synthesizing unit 20 for performing, on the basis of the picture-in-picture header information, the synthesis of the optimum image and the video data from the compression/expansion unit 12, and producing a synthesized video data, and a drawing unit 21 for displaying, on the monitor unit 40, a video on the basis of the synthesized video data.

In this embodiment, the camera unit 30 is constituted as an analog camera, and adapted to output an analog video signal based on the standard of NTSC (National Television Standards Committee).

The camera unit 30 is adapted to take an image of a monitor area at a speed of 60 frames per second, and to output, to the frame control unit 11, image data indicative of the image to be taken at a speed of 60 frames per second, while the frame control unit 11 is adapted to receive the image data from the camera unit 30, and to selectively output the image data from the camera unit 30 at, for example, a frame per second. The image of the monitor area is 720 pixels in wide and 240 pixels in height.

The compression/expansion unit 12 is adapted to compress the video data from the frame control unit 11 on the basis of a specific compression method, and to output the compressed video data to the recording control unit 13. On the other hand, the compression/expansion unit 12 is adapted to receive the compressed video data from the storage unit 14 through the recording control unit 13, to expand the compressed video data from the storage unit 14 on the basis of a specific expansion method, and to output the expanded video data to the picture-in-picture synthesizing unit 20. Here, the terms "specific compression method" and "specific expansion method" are intended to indicate, for example, JPEG (Joint Photographic Experts Group) method.

The recording control unit 13 is adapted to record video data in the storage unit 14, and to read the video data out from the storage unit 14.

The storage unit 14 is constituted by, for example, a hard disc drive for recording the compressed video data from the compression/expansion unit 12 thereon, and functions as recording means.

The moving object area detecting unit 15 is adapted to detect, on the basis of conventional difference method, motion vector method or the like, a person from the video signal from the camera unit 30, to obtain X and Y coordinates of an area including an image of the person (simply referred to as "moving object area"). More specifically, the monitor area is defined by X coordinate: 0~719, and Y coordinate: 0~239. The moving object area is defined by a rectangular area in the monitor area.

The moving object area detecting unit 15 is adapted to divide the video data from camera unit 30, the video data being constituted by 720×240 pixels per frame, into 16 sections per frame when the person is detected from the video data from the camera unit 30, each of the sections being constituted by 180×60 pixels, and to classify the sections of each frame into two groups, one of the groups including one or more sections in which the person is detected (hereinafter referred to as "moving object block"), the other of the groups including the remaining sections in which the person is not detected (hereinafter referred to as "motionless object block"). Further, the moving object area detecting unit 15 functions as moving object detecting means and dividing means. In this embodiment, sixteen sections correspond to respective blocks of the present invention. The group of the moving object blocks corresponds to the first group of the present invention, while the group of the motionless object blocks corresponds to the second group of the present invention. However, the present invention is not limited by the number of the sections, or the like.

The person area extracting unit 16 is adapted to extract an area identified as an image of his/her face from the moving object area detected by the moving object area detecting unit 15 on the basis of an ellipse Hough algorithm, and to calculate X and Y coordinates of, for example, a rectangular area including the area identified as an image of his/her face. This rectangular area is defined by the X and Y coordinates of a starting point and X and Y coordinates of an ending point.

The optimum image judging unit 17 has a memory unit (not shown) for storing data indicative of the face image of the person detected from the video of the monitor area by the face area detecting unit 16, and criterion data useful for identifying the face image of the person as an optimum image. The optimum image judging unit 17 is adapted to judge whether or not to identify the face image of the person as an optimum image on the basis of the criterion data. Additionally, the optimum image judging unit 17 functions as optimum image judging means.

The optimum image judging unit 17 is adapted to compare, for example, the face image of the person detected from the current frame with the face image of the same person detected from one or more frames prior to the current frame (hereinafter simply referred to as "previous frame") on the basis of the criterion data such as for example size, contrast, luminance, and gamma value of the face image, a direction of his/her face, and the like, and to identify the face image of the current frame as an optimum image when the face image of the current frame exceeds in sharpness the face image of each of the previous frames, for example, the face image is sharp in color, and clear in shape or the like. The term "sharp or clear image of his/her face" is intended to indicate an image useful for identifying, with ease and accuracy, a person represented by that image.

More specifically, the optimum image judging unit 17 may be adapted to evaluate the face image of each frame on the basis of, for example, three evaluation items including contrast and size of face image, and direction of his/her face, to give the face image of each frame the score corresponding to each evaluation item, to multiply the score of the face image of each frame by weight coefficient dependent on each item, and to perform the comprehensive evaluation of the face image of each frame on the basis of the score total of the face image of each frame. The optimum image judging unit 17 can compare, in score total, the face image of the current frame with the face image of each of the previous frames, identify the face image of the highest score as an optimum image. Under the condition that for example, the score to be assigned to the mage of the side view of his/her face exceed that of the image of the front view of his/her face, and the score to be assigned to the image of his/her face is changed in size of the image of his/her face, the optimum image judging unit 17 may be adapted to judge whether or not to identify the face image of the current frame as an optimum image on the basis of the score total of each face image.

The picture-in-picture header producing unit 18 is adapted to produce picture-in-picture header information shown in, for example, FIG. 2, and to add the picture-in-picture header information to the data of the face image to be outputted to the recording control unit 13. As shown in FIG. 2, the picture-in-picture header information is constituted by data including index to be used for identification of the optimum image, the capturing date and time of the optimum image, the X and Y coordinates of the starting and ending points for the face area of the optimum image, and positions of the motionless object blocks.

The picture-in-picture header processing unit 19 is adapted to select, on the basis of the picture-in-picture header information, the nearest motionless object block from among the motionless object blocks of the current frame.

The picture-in-picture header synthesizing unit 20 is adapted to receive the expanded video signal from the compression/expansion unit 12, to perform the synthesis of the nearest motionless object block of the current frame selected by the picture-in-picture header processing unit 19 from the expanded video signal and the optimum image, and to produce a synthesized image. Further, the picture-in-picture header synthesizing unit 20 functions as image synthesizing means.

The drawing unit 21 is adapted to output, to the monitor unit 40, a video signal indicative of the synthesized image produced by the picture-in-picture synthesizing unit 20.

The following description will be then directed to the operation of the monitor recording device 10 according to the first embodiment of the present invention.

Figure 3:
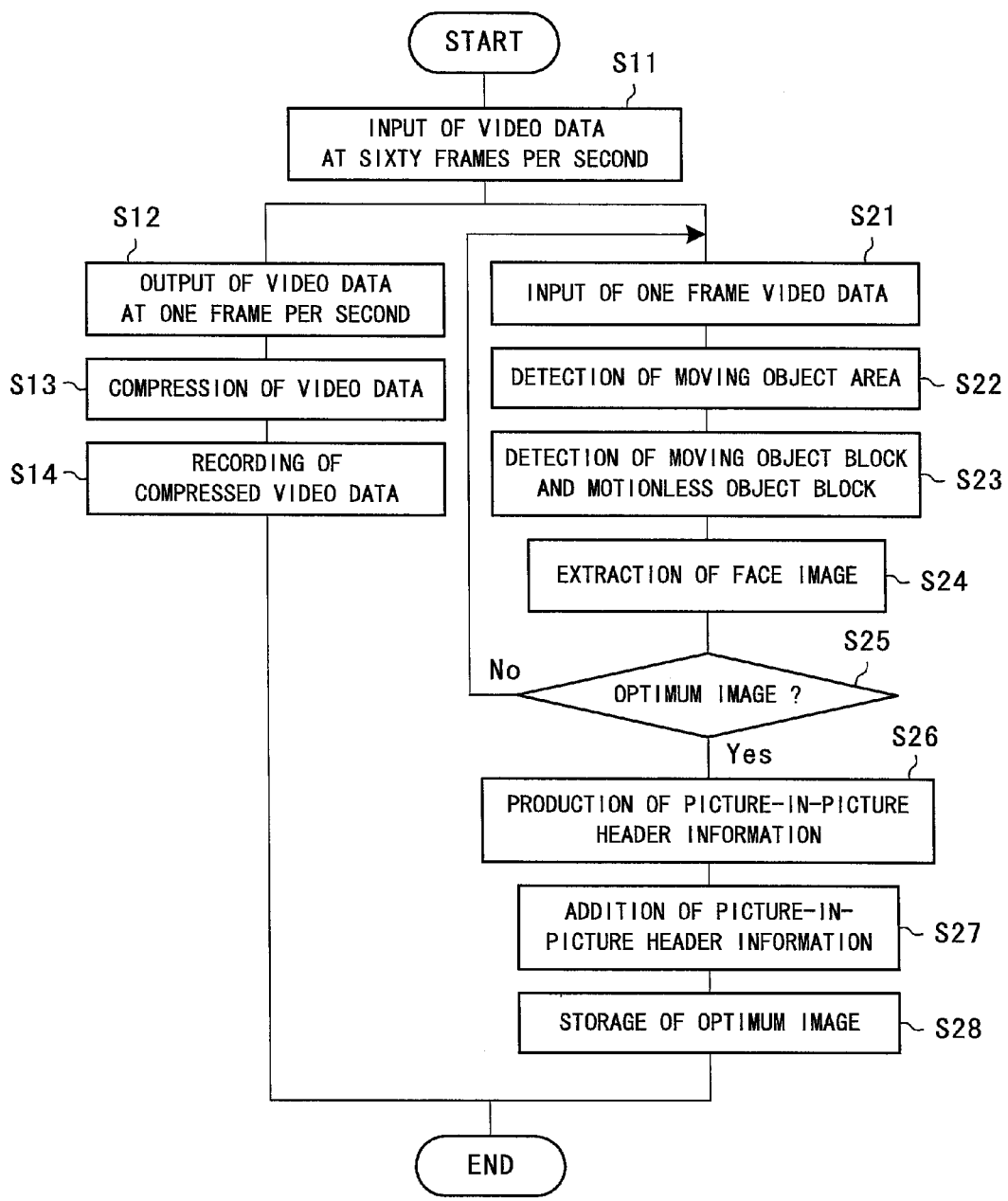
FIG. 3 is a flowchart showing steps of recording video data in the monitor recording device according to the first embodiment of the present invention.

The steps of recording a video of a monitor area, when a person is in the monitor area, together with an optimum image of his/her face will be described hereinafter with reference to FIG. 3.

The video of the monitor area constituted by 720×240 pixels, and produced at the rate of 60 frames per second on the basis of NTSC method is firstly received by the frame control unit 11 and the moving object detecting unit 15 (in the step S11). The video of the monitor area is then outputted at the rate of one frame per second by the frame control unit 11 (in the step S12). Accordingly, the video of the remaining frames, i.e., fifty nine frames of each second is thinned out, and the video indicative of one frame of each second is outputted by the frame control unit 11.

The video indicative of one frame of each second from the frame control unit 11 is then compressed on the basis of, for example, MPEG method by the compression/expansion unit 12 (in the step S13). The compressed video is then outputted to the recording control unit 13, and recorded in the storage unit 14 (in the step S14).

On the other hand, the video of one frame of each second is inputted to the moving object area detecting unit 15 (in the step S21). The moving object area is then detected on the basis of difference method, motion vector method, and the like by the moving object area detecting unit 15 (in the step S22). When, for example, the detection of the moving object area is performed on the basis of the difference method, the moving object area detecting unit 15 calculates the difference between the image of the current frame and the image of the previously adjacent frame, and detects the moving object from the video of the monitor area on the basis of the difference between the image of the current frame and the image of the previously adjacent frame, identifies a rectangular area including the detected moving object as the moving object area, this rectangular area forming part of the image of the monitor area defined by X coordinates (within the range of 0 to 719) and Y coordinates (within the range of 0 to 239).

The image of the monitor area is then divided into a plurality of blocks, when the specific moving object is in the monitor area, the judgment is made on whether or not each block includes an image of the moving object.

Figure 4:
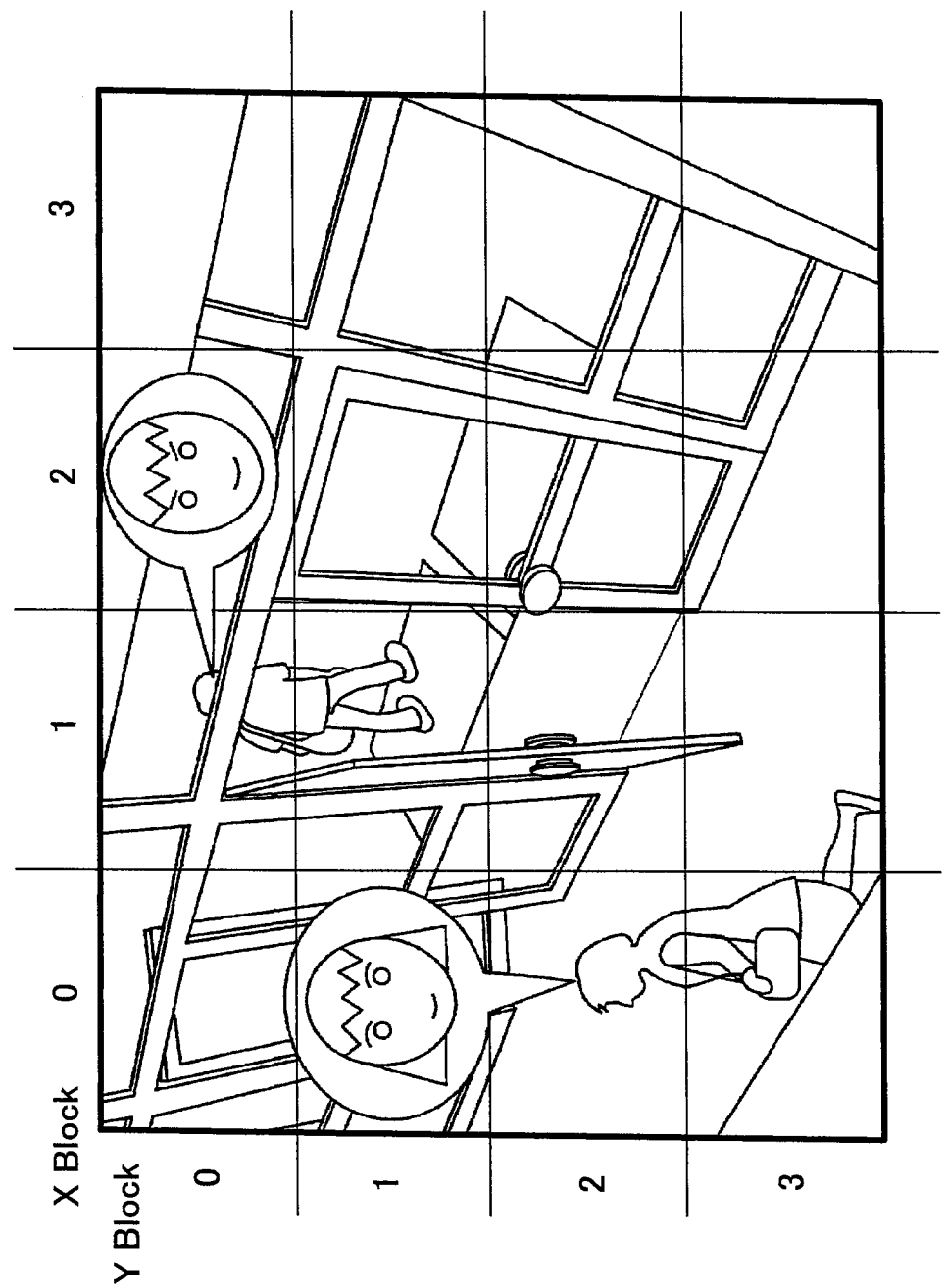
FIG. 4 is a diagram showing an example of an image of a monitor area displayed with an optimum image of an object by the monitor recording device according to the first embodiment of the present invention.

More specifically, the image of the monitor area constituted by 720×240 pixels is divided into four equal parts in each of X-axis and Y-axis directions as shown in, for example, FIG. 4, in other words, divided into 16 blocks each of which is constituted by 180×60 pixels.

The face area identified as his/her face is then extracted from the image of the moving object by the moving object area detecting unit 15 on the basis of, for example, an ellipse Hough algorithm (in the step S24), this face area forming part of the image of the monitor area defined by X coordinates (within the range of 0 to 719) and Y coordinates (within the range of 0 to 239).

The judgment is then made by the optimum image judging unit 17 (in the step S25) on whether or not the face image of the current frame exceeds the face image of the previous frame on the basis of the comparison between two face images extracted from the moving object image of the current and previous frames.

For example, the optimum image judging unit 17 may evaluate the face image of each frame on the basis of, for example, three evaluation items including contrast and size of face image, and direction of his/her face, give the face image of each frame the score corresponding to each evaluation item, multiply the score of the face image of each frame by weight coefficient dependent on each item, perform the comprehensive evaluation of the face image of each frame on the basis of the score total of the face image of each frame. The optimum image judging unit 17 can compare, in score total, the face image of the current frame with the face image of each of the previous frames, identify the face image of the highest score as an optimum image.

When the face image of the current frame does not exceed the face image of the previous frame, the step S25 proceeds to the step S21. The face image of the next frame is inputted into the optimum image judging unit 17. The judgment is made on whether or not the face image of the next frame exceeds the face image of the previous frame.

When, on the other hand, the face image of the current frame is identified as an optimum image of his/her face in step S25, the picture-in-picture header information shown in, for example, FIG. 2 is produced by the picture-in-picture header producing unit 18 (in the step S26).

As shown in FIG. 2, control data to be used for identification of the face image is produced as index data. The data indicative of the capturing date and time of the optimum image is produced. The rectangular area defended by the X and Y coordinates of the starting point and the X and Y coordinates of the ending points, the rectangular area including the extracted face area, is produced as face area. The motionless object block is defined by a pair of numbers (X and Y direction numbers) assigned to that motionless object block. Here, the shooting information is not limited by only the data and time of the face image.

The picture-in-picture header information is then added to the face image identified as an optimum image of his/her face by the picture-in-picture header producing unit 18 (in the step S27).

The face image identified as an optimum image of his/her face is then recorded in the storage unit 14 with the picture-in-picture header information by the recording control unit 13 (in the step S28).

Figure 5:
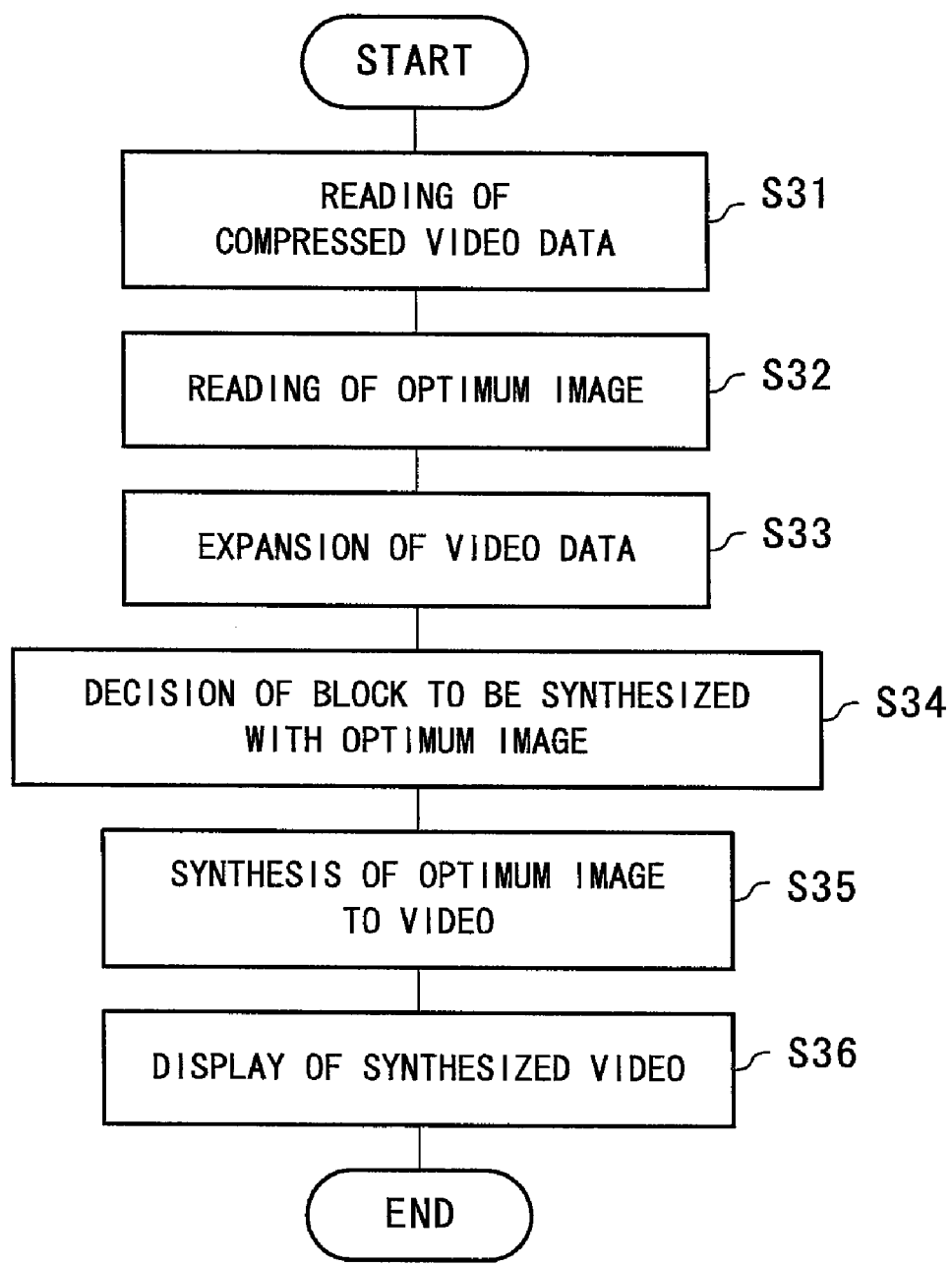
FIG. 5 is a flowchart showing steps of reading the video data in the monitor recording device according to the first embodiment of the present invention.

The steps of displaying the image of the monitor area on a screen with the face image identified as an optimum image of his/her face will be described hereinafter with reference to FIG. 5.

The compressed image data is firstly read out from the storage unit 14, and then outputted to the compression/expansion unit 12 by the recording control unit 13 (in the step S31), while the optimum image of his/her face corresponding to the shooting date and time of the compressed image is read out from the storage unit 14 on the basis of the picture-in-picture header information, and then outputted to the picture-in-picture header processing unit 19 by the recording control unit 13 (in the step S32).

The compressed image data is then expanded on the basis of, for example, the MPEG method by the compression/expansion unit 12 (in the step S33).

Then, the picture-in-picture header processing unit 19 calculates the distance between each of the motionless object blocks and the X and Y coordinates of the optimum image of his/her face, and decides one of the motionless object blocks as a closest motionless object block on the basis of the distance between each of the motionless object blocks and the X and Y coordinates of the optimum image of his/her face.

The optimum image of his/her face is then synthesized with the motionless object block decided in the step S24 by the synthesizing unit 20 (in the step S35).

The expanded image of the monitor area synthesized with the optimum image of his/her face is then displayed by the drawing unit 21 on a screen of the monitor unit 40 as shown in, for example, FIG. 4 (in the step S36). FIG. 4 is a schematic view showing an image of a monitor area having a block (X coordinate: 0, Y coordinate: 1) synthesized with an optimum image of a man going in and out of an entrance hall, and a block (X coordinate: 2, Y coordinate: 0) synthesized with an optimum image of a lady going in the entrance hall.

From the foregoing description, it will be understood that the monitor recording device 10 according to the first embodiment can display, when a person is in a monitor area, the image of the monitor area with the optimum image of his/her face, reduce the video data to be recorded in the storage unit, and identify an intruder with ease from the reduced video data by reason that the optimum image judging unit 17 is adapted to judge whether or not to identify the face image extracted by the person area detecting unit 16 as an optimum image on the basis of the criterion, the storage unit 14 is adapted to record the video data thinned in frame of the monitor area with the optimum image added with the shooting information.

In this embodiment, the image of the monitor area constituted by 720×240 pixels is divided into 16 blocks each of which is constituted by 180×60 pixels, the judgment is then made on whether or not each of the blocks includes an image of a person. However, the present invention is not limited to the above exemplification.

Second Embodiment

The following description will be directed to the construction of the monitor recording device according to the second embodiment of the present invention.

The constituent elements of the monitor recording device according to the second embodiment different from those of the monitor recording device 10 (see FIG. 1) according to the first embodiment will be described in detail hereinafter. The constituent elements of the monitor recording device according to the second embodiment entirely the same as those of the monitor recording device according to the first embodiment will not be described but bear the same reference numerals and legends as those of the monitor recording device according to the first embodiment.

Figure 6:
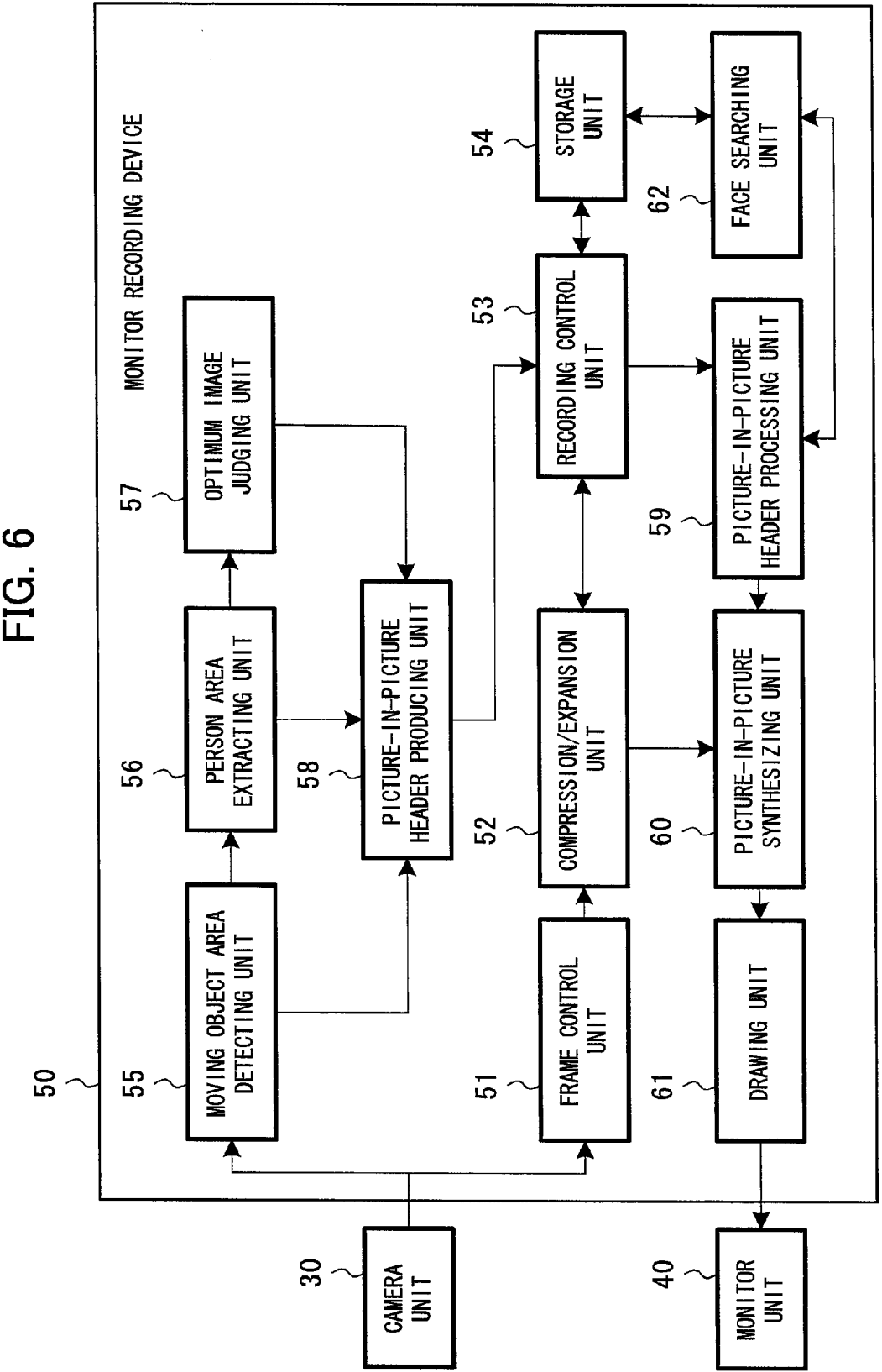
FIG. 6 is a block diagram showing the second embodiment of the monitor recording device according to the present invention.

As shown in FIG. 6, the monitor recording device 50 according to the second embodiment comprises a camera unit 30 for taking an image of a monitor area at a specific frame rate, and outputting a video signal indicative of the image, a frame control unit 51 for thinning in frame the video signal from the camera unit 30, a compression/expansion unit 52 for compressing the video signal thinned in frame, and producing compressed video data, a storage unit 54 for recording the compressed video data therein, a recording control unit 53 for controlling the storage unit 54, a moving object area detecting unit 55 for detecting, from among a plurality of sections of each frame of the video signal from the camera unit 30, one or more sections including an image of a person going in and out of the monitor area, a person extracting unit 56 for extracting an image of his/her face from one or more sections detected by the moving object area detecting unit 55, an optimum image judging unit 57 for judging whether or not the image of his/her face extracted from one or more sections of the current frame is clear, and identifying the image of his/her face extracted from the current frame as an optimum image when that is, till now, the clearest of the images of his/her face, a picture-in-picture header producing unit 58 for producing picture-in-picture header information to be added to the optimum image, a picture-in-picture header processing unit 59 for processing the picture-in-picture header information, a picture-in-picture synthesizing unit 60 for performing, on the basis of the picture-in-picture header information, the synthesis of the optimum image and the video data from the compression/expansion unit 52, and producing a synthesized video data, a drawing unit 61 for displaying, on the monitor unit 40, a video on the basis of the synthesized video data, and a face searching unit for searching the data stored in the storage unit 54.

As shown in FIG. 6, the monitor recording device 50 according to the second embodiment is substantially the same in construction as the monitor recording device 10 according to the first embodiment (see FIG. 1) except for the face searching unit 62. Therefore, only the face searching unit 62 will be described hereinafter, and the remaining parts of the monitor recording device 50 according to the second embodiment will not be described.

The face searching unit 62 is adapted to search the data recorded in the storage unit 54 for the optimum image the same in person as the face image from the picture-in-picture processing unit 59. The storage unit 54 functions as storage means of the present invention. The data of the face image recorded in the storage unit 54 is constituted by specific data of the present invention. The face searching unit 62 is constituted as searching means of the present invention.

Figure 7:
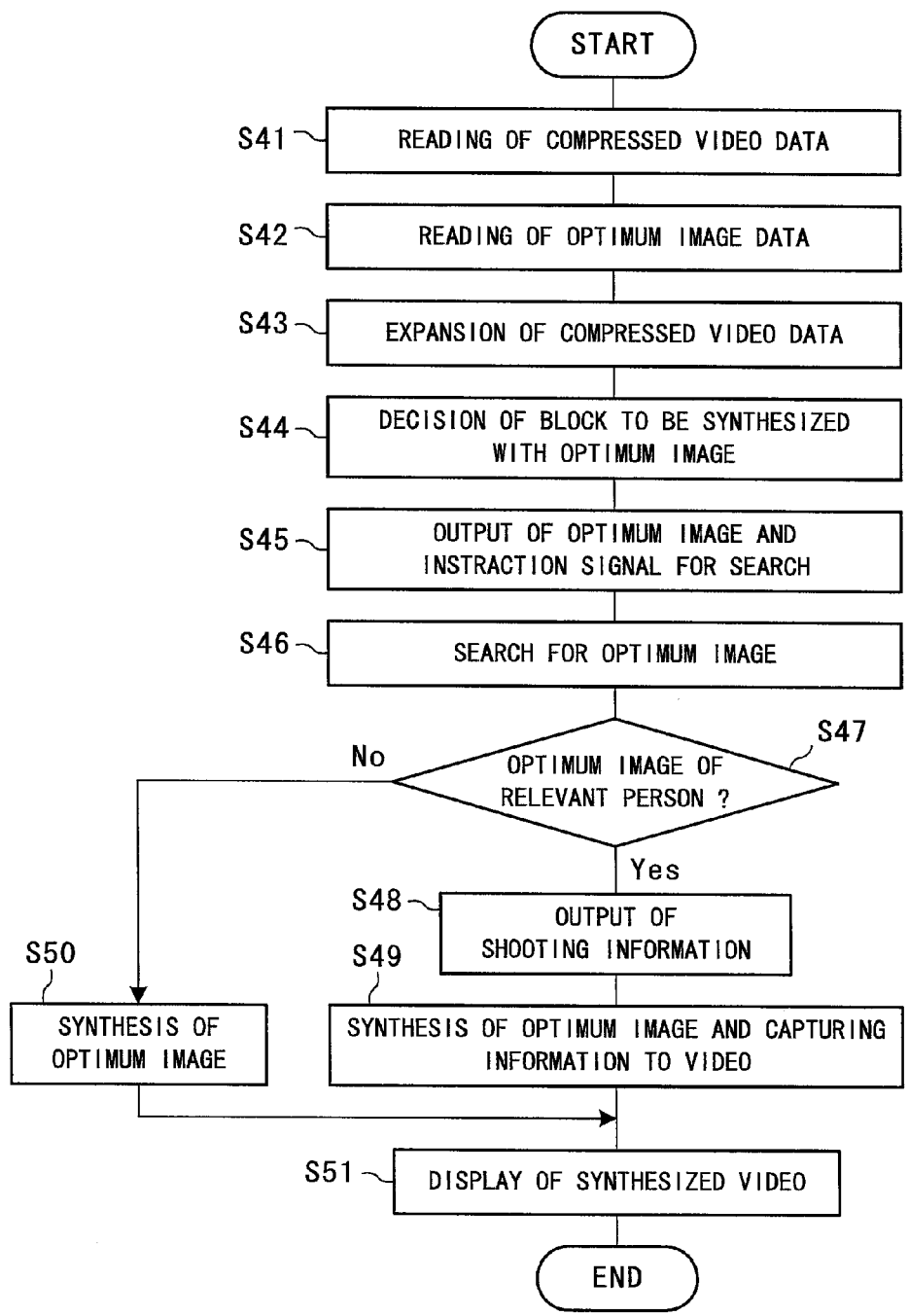
FIG. 7 is a flowchart showing steps of recording video data in the monitor recording device according to the second embodiment of the present invention.

The following description will be then directed to the operation of the monitor recording device 50 according to the second embodiment of the present invention. The steps of recording the image of the monitor area with the optimum image the same as steps shown in FIG. 3 will not be described thereinafter. The steps of displaying the image of the monitor area with the optimum image will be described thereinafter with reference to FIG. 7.

The compressed image data is firstly read out from the storage unit 54 by the recording control unit 53 (in the step S41). The optimum image data corresponding to the shooting date and time of the compressed image data read out from the storage unit 54.

The compressed image data is then expanded on the basis of, for example, the MPEG method by the compression/expansion unit 52 (in the step S43).

The position of one motionless object block closest to a position of a moving object block in which the his/her face is detected is then calculated by the picture-in-picture header processing unit 59 from the X and Y coordinates of the face image included in the picture-in-picture header information. This motionless object block is decided (in the step 44) as a block to be synthesized with the optimum image.

Then, the picture-in-picture header processing unit 59 issues an instruction to search the data recorded in the storage unit 54 for the optimum image read out in step S42 and the optimum image prior to this optimum image, and outputs an instruction signal indicative of the instruction to the face searching unit 62 (in the step 44).

The face searching unit 62 searches the data recorded in the storage unit 54 for the optimum image in response to the instruction signal from the picture-in-picture header processing unit 59. Here, the face searching unit 62 searches, on the basis of the face identification algorithm, the data recorded in the storage unit 54 for the optimum image and the previous optimum image of the same person.

The judgment is then made by the face searching unit 62 on whether or not the optimum image of the same person is in the storage unit 54 (in the step S47). When the optimum image of the same person is detected in the storage unit 54, the shooting information added to the detected optimum image of the same person is outputted to the picture-in-picture header synthesizing unit 60 (in the step S48).

The synthesis of the motionless object block selected in the step S44 from the video thinned in frame represented by the video signal, the extracted optimum image of his/her face, and the shooting information including shooting date and time of the relevant optimum image is then performed by the picture-in-picture synthesizing unit 60 (in the step S49).

When, on the other hand, the judgment is made in the step S47 that the optimum image of the same person is not in the storage unit 54, the synthesis of the motionless object block selected in the step S44 from the video thinned in frame represented by the video signal, and the extracted optimum image of his/her face is performed by the picture-in-picture synthesizing unit 60 (in the step S50).

Figure 8:
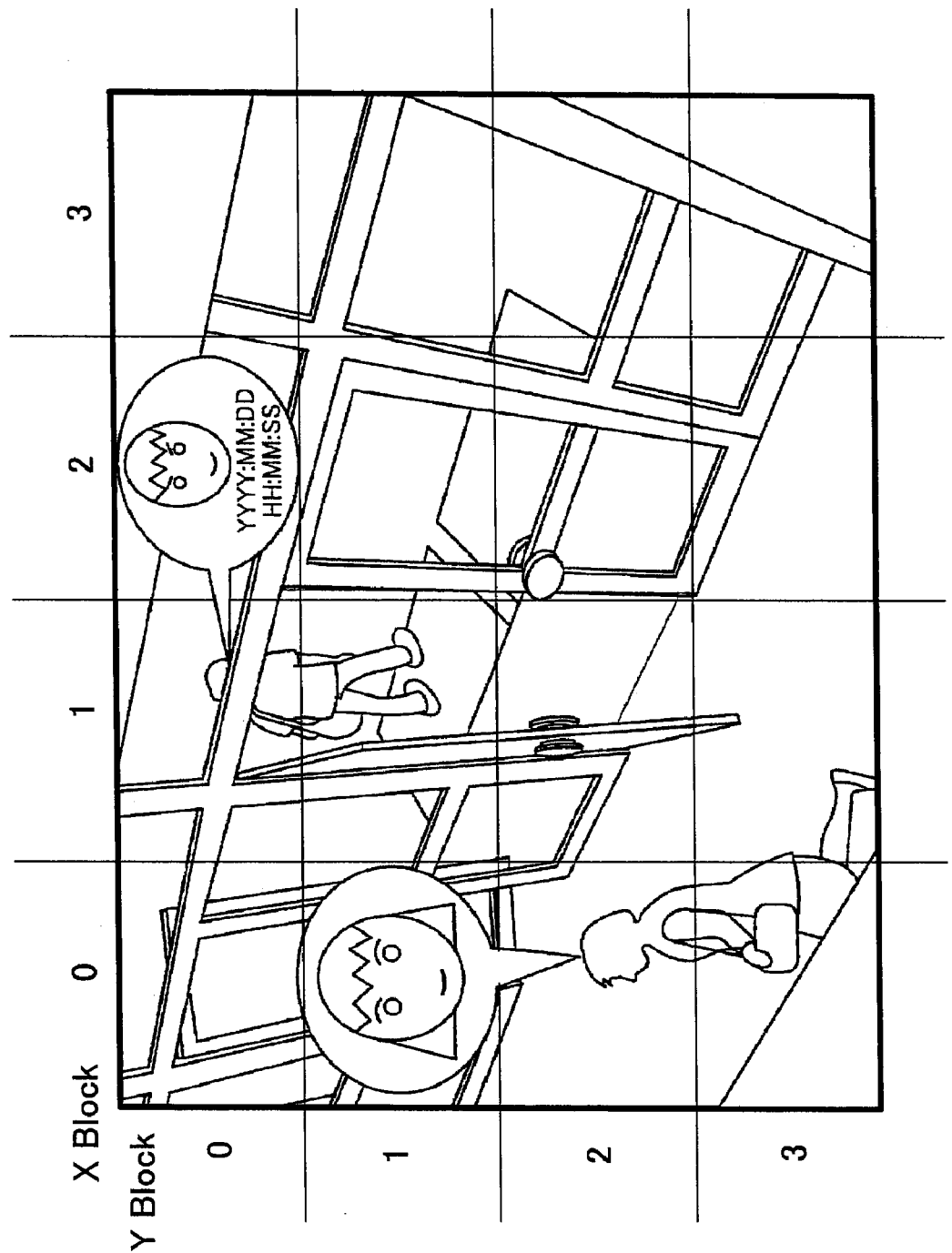
FIG. 8 is a diagram showing an example of an image of a monitor area displayed with an optimum image of an object by the monitor recording device according to the second embodiment of the present invention.

The synthesized video is then displayed on the monitor unit 40 by the drawing unit 61. When the optimum image of the same person is in the storage unit 54, the synthesis shown in, for example, FIG. 8 is displayed on the monitor unit 40 (in the step S51). FIG. 8 is a schematic view showing an image of a monitor area having a block (X coordinate: 0, Y coordinate: 1) synthesized with an optimum image of a man going in and out of an entrance hall, and a block (X coordinate: 2, Y coordinate: 0) synthesized with an optimum image of a lady going in the entrance hall.

From the foregoing description, it will be understood that the monitor recording device 50 according to the second embodiment of the present invention can perform the synthesis of the optimum image and the shooting information of the optimum image on the video thinned in frame, by reason that the face searching unit 62 is adapted to search the data recorded in the storage unit 54 for the optimum image of the same person, and the picture-in-picture header synthesizing unit 60 is adapted to perform the synthesis of the optimum image, the shooting information of the optimum image, and the designated block of the video thinned in frame when the optimum image of the same person is in the storage unit 54.

The conventional monitor recording device tends to fail to obtain image data useful for identifying a specific moving object, by reason that the conventional monitor recording device is adapted to record a video signal indicative of the video thinned in frame. However, the monitor recording device according to the second embodiment of the present invention can obtain image data useful for identifying a specific moving object even if the video is thinned in frame, and enhance a degree of an accuracy in identifying a specific moving object.

In this embodiment, the specific moving object is exemplified by a person going in and out of the monitor area. However, the present invention is not limited by the person. Even if the specific moving object is exemplified by, for example, an automotive vehicle going in and out of a parking space, or driving down a specific zone of a road, or an specific animal which is in a specific monitor area, the present invention can obtain the same advantageous effects. In this embodiment, the monitor recording device 10 comprises a person extracting unit 16 for extracting an image of his/her face from one or more sections detected by the moving object area detecting unit 15, the optimum image judging unit 17 is adapted to judge whether or not to identify the extracted face image as an optimum image on the basis of the criterion. However, the present invention is not limited by this construction. For example, the person extracting unit 16 may be replaced by an extracting unit for extracting an automotive vehicle from the video of the monitor area. The optimum image judging unit 17 may be adapted to judge whether or not identify the extracted image of the automotive vehicle as an optimum image. The extracting unit may be widely applied for many purposes. Needless to say, the extracting unit may be adapted to extract an image of a license plate of an automotive vehicle from the video of the monitor area.

INDUSTRIAL APPLICABILITY OF THE PRESENT INVENTION

As will be seen from the foregoing description, the monitor recording device according to the present invention has an advantageous effect of recording an optimum image useful for identifying a specific moving object such as for example an intruder with no difficulty, and useful as a monitor recording device for recording video data indicative of a video of a person going in and out of a monitor area.

What is claimed is:

1. A method of recording monitoring data, comprising:
   detecting, from each frame of a plurality of frames of a video of a monitor area, an image of a specific moving object which is in the monitor area;
   judging, as an optimum image, the image of the specific moving object detected from the video of said monitor area when the image of the specific moving object optimally complies with specific requirements;
   recording the optimum image;
   thinning the video of the monitor area by eliminating frames from the video and outputting a thinned video signal indicative of the video;
   dividing each frame of the plurality of frames of the video of the monitor area into a plurality of sections;
   classifying the plurality of sections of each frame into first and second groups, the first group including one or more sections in which the specific moving object is detected, the second group including remaining sections in which the specific moving object is not detected; and
   performing a picture-in-picture synthesis of the optimum image of the specific moving object and the specific moving object recorded in the thinned video signal to ensure that both of the optimum image and the specific moving object are shown in an image of the monitor area without overlap of the optimum image and the specific moving object, the optimum image being synthesized with a nearest section selected from among the sections of the second group on the basis of distances of the sections of the second group to each section of the one or more sections of the first group.

2. The method as set forth in claim 1, which further comprises recording shooting information of the optimum image, the shooting information including shooting date and time of the optimum image.

3. The method as set forth in claim 1, which further comprises:
　　searching specific data recorded during the recording step for data indicative of said optimum image of the specific moving object;
　　extracting the data indicative of the optimum image of the specific moving object from the specific data; and
　　performing the picture-in-picture synthesis of the thinned video signal, the optimum image of the specific moving object, and shooting information including shooting date and time of the optimum image of the specific moving object.

4. The method as set forth in claim 1, in which the image of the specific moving object is constituted by an image of a person which is in the monitor area, the optimum image of the specific moving object is constituted by an image of the person's face, and the specific requirements relate to at least one of size, contrast, luminance, gamma value, and direction of the person's face extracted from the video of the monitor area.

5. The method as set forth in claim 1, in which the image of the specific moving object is constituted by an image of an automotive vehicle which is in the monitor area, the optimum image is constituted by an image of a license plate of the automotive vehicle, and the specific requirements relate to at least one of size, contrast, luminance, gamma value, and direction of the license plate extracted from the video of said monitor area.

6. The method as set forth in claim 1, wherein the thinning thins the video signal at a specific frame rate by eliminating the frames from the video of the monitor area.

\* \* \* \* \*